May 9, 1933.   S. HAUSMAN ET AL   1,907,804
ELECTRIC MEASURING INSTRUMENT
Filed Nov. 18, 1929   2 Sheets-Sheet 1
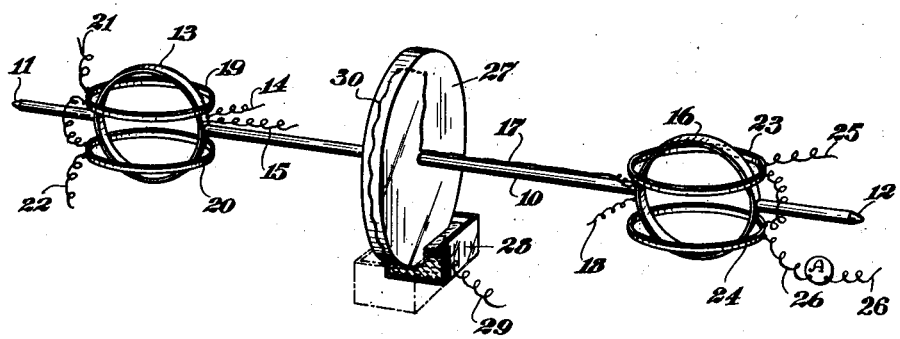
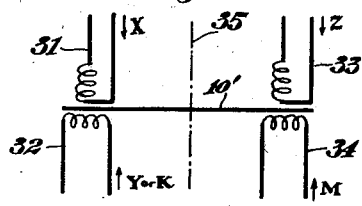
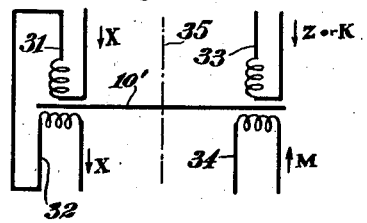
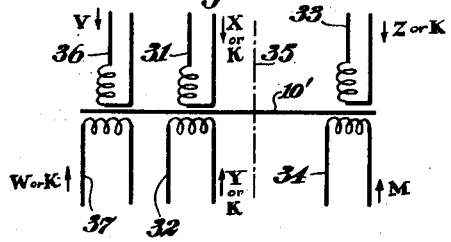
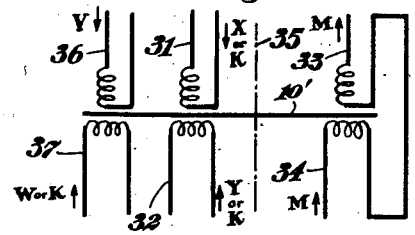
INVENTORS
Sidney Hausman,
Walter Veit,
BY
Frederick Breitenfeld
ATTORNEY Patented May 9, 1933

1,907,804

UNITED STATES PATENT OFFICE

SIDNEY HAUSMAN, OF ARLINGTON, NEW JERSEY, AND WALTER VEIT, OF NEW YORK, N. Y.

ELECTRIC MEASURING INSTRUMENT

Application filed November 18, 1929. Serial No. 407,919.

Our present invention relates generally to electrical measuring instruments, and has particular reference to the measurement of relatively complex quantities.

We have heretofore succeeded in devising a relatively simple electrical measuring instrument whose operation is predicated upon the wellknown mutual coaction of a pair of inductance coils, and by means of which the ratio of one quantity to another could be directly measured, registered, or recorded. For example, by passing a current through one inductance coil proportional to, let us say, factor $x$, and by passing a current through another and relatively movable inductance coil proportional to the reciprocal of a second factor, e. g., $\frac{1}{y}$, it is possible to measure, register, or record the ratio of $x:y$ by allowing the two coils to coact with each other and causing the coaction to effect, e. g., a corresponding movement of a pointer or the like.

It is a general object of our present invention to harness and couple the foregoing general principle of operation to the further wellknown truth that where $a=bx$, then $x$ is a measure of the ratio of $a:b$; and to provide an electrical measuring instrument whose operation is based upon these principles and by means of which measurements may be efficiently made of varied complex quantities, not merely ratios of one factor to another. As a specific example, for the purpose of explaining the general object of our present invention, it may be stated at this point that we are enabled by our present device to measure, for instance, a mean proportional between two quantities, or, algebraically speaking, $\sqrt{xy}$. This particular measurement is by no means the sole objective, however, as will be more fully appreciated after this specification has been read, since the quantities and algebraic functions capable of measurement by our present invention are of an extremely varied character.

Stated in general terms, it is an object of our invention to provide an electric measuring instrument which will give a direct reading of any predetermined desired algebraic function of one, two, or more variable or constant quantities or factors.

The specific applications of our measuring instrument to the engineering field are so numerous and of such a varied character that no attempt will here be made to make an exhaustive list. Suffice it to say that by means of our present invention a relatively simple electric measuring instrument may be employed in connection with mechanical, electrical, or other plants or establishments, or in connection with machines in general (using the term "machine" in its broadest sense) to measure not only simple ratios but also more complex ratios and other algebraic functions of not only two but also three, four, or more variable factors of operation. Since innumerable formulae are employed in actual engineering practice to determine by computation varied desired quantities or relationships, it will be obvious that an instrument capable of giving a direct reading which is directly proportional to a complicated formula, will have wide applicability and will prove extremely valuable.

The general features of our present device resides, in part, in the fact that it is of the relatively simple structural character of electrical measuring instruments in general, consisting of relatively few movable parts and being furnished with certain electrical leads, terminals, a suitably calibrated dial, a pointer, and other such usual and customary accessories. The instrument is compact and, in a preferred embodiment, entirely automatic, so that the proper predetermined arrangement of parts therein during manufacture, and the proper calibration of the dial, etc., will enable the user merely to install the instrument in the customary simple manner and thereafter directly read or record the desired quantities without further manipulation.

For the purpose of explaining the general nature of our invention in greater detail, we have illustrated a number of embodiments thereof in the accompanying drawings, wherein—

Figure 1 is a perspective view of certain vital portions of an instrument or meter embodying the features of our invention and illustrating, perhaps, the simplest manner of carrying out our inventive concept;

Figure 2 is a diagrammatic representation of the most important electrical parts of the device of Figure 1;

Figure 3 is a view similar to Figure 2, showing a modification for accomplishing modified results;

Figure 4 is a view similar to Figure 2, showing a modification of a different character;

Figure 12:
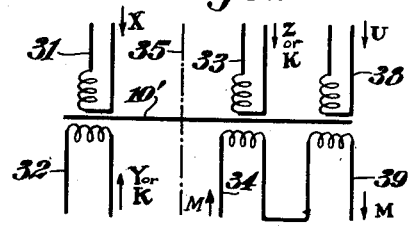
Figure 13:
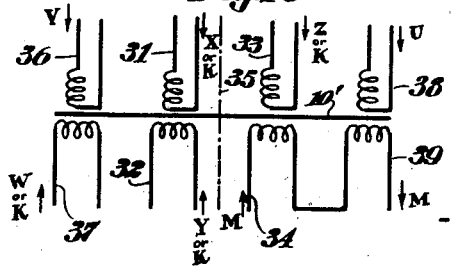

Figures 5–11 inclusive show modifications of the arrangement of Figure 4;

Figure 12 shows a further modification;

Figure 13 shows a still further modification; and

Figure 14:
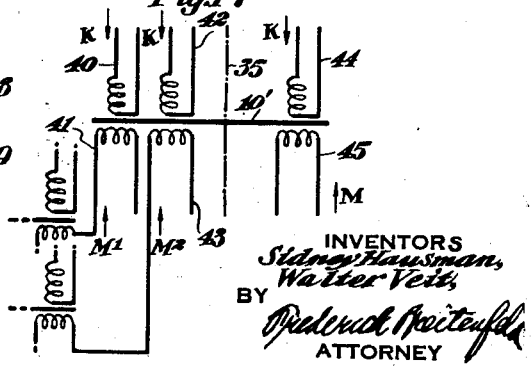

Figure 14 is a view similar to Figure 4 illustrating, merely by way of example, the tremendously great possibilities of our instrument.

It will be understood that each of Figures 3–14 inclusive is merely a diagrammatic representation of certain essential parts of a complete electrical measuring instrument, just as Figure 2 is merely a diagrammatic representation, as will be presently understood, of the simple type of instrument shown in conventional perspective form in Figure 1.

In Figure 1, we have shown certain apparatus which we contemplate will be mounted within a suitable casing, not herein illustrated, which casing will be similar to that type of casing which is customarily used in connection with electrical measuring devices of wellknown character.

We have shown a movable member in the form of a rotatable spindle 10, suitably journaled at its opposite ends 11 and 12 or elsewhere along its axis. Mounted on the spindle are a plurality of inductance coils, and, in Figure 1, we have shown two inductance coils 13 and 16. The coil 13 is provided with the leads 14 and 15, and the coil 16 is provided with the leads 17 and 18. The coils 13 and 16 move with the movable member, i. e., in Figure 1 they rotate with the spindle 10.

The coil 13 is mounted in cooperative or coactable relationship to a fixed inductance coil which we have illustratively shown composed of the two parts 19 and 20. These two parts are essentially a single inductance coil provided with the leads 21 and 22. The coil 16 is similarly associated with a fixed or stationary coil constituted of the two parts 23 and 24 and provided with the leads 25 and 26.

Before describing certain other features, we will state that our invention is predicated upon the passage of a variable and measurable electric current through one of the four inductance coils above described, and the passage through the other inductance coils of other currents in such a manner that counter-torques will be exerted upon the spindle 10. Our invention then provides means for suitably varying the measurable current so that these counter-torques will be equalized and the spindle 10 thereby brought to rest. When such equality is established, it is evident that the product of the fluxes induced in one pair of coactably arranged coils will be equal to the product of the fluxes induced by the other pair of coactably arranged coils; and as a result, the measurable current will constantly be proportional to a predetermined algebraic function of the other currents. Where two pairs of coactably arranged coils are used, as in Figure 1, the measurable current will, for example, be proportional to the product of the two currents passing through the other pair of coils, divided by the current passing through the coil which cooperates with that through which the measurable current is passed. The measurable current is measured or indicated by means of a current-measuring instrument. For example, where the measurable current is made to pass through the coils 23 and 24, an ammeter may be arranged in the lead 26, as indicated in Figure 1.

In accordance with our present invention, we provide an automatic means for varying the measurable current so that the foregoing equality will be automatically established. Thus, in Figure 1, we have shown a disc or wheel 27 mounted for rotation with the spindle 10 and having its lower portion immersed in a mercury well 28. The latter is in constant electrical connection with the lead 29, and the lead 17 previously mentioned is suitably guided along the spindle 10 and mounted in association with the wheel 27 so that an exposed portion thereof 30 is arranged circumferentially around the peripheral surface of the wheel 27. The portion 30 constitutes a resistance and may, obviously, be composed of more than the single wire illustrated at 30.

The angular position of the spindle 10, and hence of the wheel 27, will predetermine the amount of resistance operatively interposed in the circuit which extends from the lead 29, through the portion 30, the lead 17, the movable coil 16, and the lead 18. The automatic variation of the resistance in this circuit provides for the automatic variation or alteration of the measurable current which is passed through this circuit, i. e., through the coil 16. Obviously, this current may be varied by means other than the automatic means illustrated, as, for example, by a manually controllable resistance or rheostat, but we prefer the construction illustrated because it obviates the necessity for such manipulation, and the device establishes the desired equality of torques or forces entirely by itself.

In Figure 2, and in the figures which follow, we have illustrated certain portions of the apparatus of Figure 1 in a diagrammatic manner. For example, the horizontal line 10' represents the movable member shown in Figure 1 as a spindle 10. The coil 31 represents one of the coils illustrated at the left of Figure 1, and the coil 32 represents the corresponding coactably arranged coil. In other words, one of the coils 31—32 is movably mounted in association with the movable member 10', and the other coil is fixed in coactable relationship thereto. Furthermore, in Figure 2, the coils 33 and 34 represent the second pair of coactably arranged coils shown at the right of Figure 1, and one of these is fixed and the other movable. The dot and dash line 35 of Figure 2 does not necessarily represent the wheel 27 of Figure 1 but represents the equality sign in the equality which is established either manually or automatically. In other words, in Figure 2 and in the subsequent figures, the coil pair or pairs shown on one side of the line 35 are considered to exert a torque in one direction, and the coil pair or pairs on the other side of the line 35 are considered to exert a counter-torque.

To describe the operation of our device not only in Figure 2 but in the subsequent figures, a system of notation will be employed wherein M represents the variable and measurable current, K represents a constant current (not necessarily equal, however, to other constant currents K) and the letters S, T, U, V, W, X, Y, Z represents variable currents. We will proceed to show how our instrument may be employed so that the measurable current M will always be proportional to a predetermined algebraic function of the constant and/or variable currents K, S, T, . . . Z whenever the equality of forces upon the movable member 10' is established.

For example, upon reference to Figure 2, we will assume that the measurable current M is passed through the coil 34. Through the coil 33 we pass a variable current Z; through the coil 31 we pass a variable current X; and through the coil 32 we pass either a third variable current Y or a constant current K. With the currents X and K coacting in the coils 31 and 32, a torque is exerted upon the movable member 10'; and a counter-torque is set up by the coaction of the currents M and Z. By manual or automatic variation of the current M, an equality is established, represented by the dot and dash line 35, whereby we may state, algebraically, that $XK = MZ$. As a result, it is evident that the current M (which may be measured by any suitable current-measuring instrument, preferably incorporated with the device itself) will be equal to $$\frac{XK}{Z}.$$

Thus, by way of example, if the current X is made proportional, in practice, to one factor of operation or to one variable of a mechanical system, and if the current Z is similarly made proportional to another variable factor, the current M measures the ratio between these factors or quantities.

To place this in the form of a formula, we have therefore demonstrated the possibility of using our instrument so that:—

(1) $$M \propto \frac{X}{Z}.$$

Similarly, where the currents X and Y are employed, Y being a third variable current suitably made proportional to a variable factor of mechanical or electrical operation, the instrument may be employed to read the predetermined algebraic function represented by:—

(2) $$M \propto \frac{XY}{Z}.$$

In Figure 3 we have shown the same coils 31, 32, 33, and 34, but we have modified the construction so that in Figure 3, coils 31 and 32 are connected in series.

From the foregoing discussion in connection with Figure 2, it will be obvious that the device of Figure 3 may be employed to determine and record or register four additional algebraic functions. Where, as illustrated, the measurable current M is passed through the coil 34, it may be caused to serve as a measure of either of the relationships represented most simply by the algebraic formulæ:—

(3) $$M \propto X^2$$

(4) $$M \propto \frac{X^2}{Z}.$$

And if the measurable current M is made to pass through the series-connected coils 31 and 32, and the current X is made to pass through the coil 34, the instrument is enabled to measure the algebraic functions represented by the formulæ:—

(5) $$M \propto \sqrt{X}$$

(6) $$M \propto \sqrt{XZ}$$

That these formulæ may have a more tangible significance so far as practical application is concerned, it may be pointed out at this time that Formula (6) above represents the measurement by an electrical measuring instrument of a mean proportional between two variable quantities X and Z.

Proceeding in a similar way with similar notations and similar reasoning, we show in Figure 4 the possibility of measuring a still further type of algebraic function. Figure 4 represents a modification of the device wherein two pairs of coactably arranged inductance coils are arranged on one side of the equality line. This does not mean, however, that these two pairs of coils are necessarily mounted in adjacence in the instrument itself; it means simply that the torques exerted by them are in the same direction. In other words, the device of Figure 4 consists of a movable member or spindle such as that shown in Figure 1, wherein a total of three pairs of coactably arranged inductance coils are positioned along the spindle, two of which operate to exert torque in one direction, and the other of which operates to exert a counter-torque. Such a device is not much more complicated than that of Figure 1 and operates in substantially the same way, either with or without the automatic-variation wheel 27 or its equivalent.

Thus, in Figure 4, we have shown the previously mentioned coils 31, 32, 33, and 34, and we have shown in addition the two further coactably arranged coils 36 and 37.

The possibilities of the device of Figure 4 are slightly more varied. If we pass the measurable current M through the coil 34, as before, and the variable current V through the coil 36, then we may pass through the coil 33 either a variable current Z or a constant current K; we may pass through the coil 32 either a variable current Y or a constant current K; we may pass through the coil 31 either a variable current X or a constant current K; and we may pass through the coil 37 either a variable current W or a constant current K.

The simplest algebraic function to be measured is established by employing a current or currents K in coils 37, 31, 32, and 33. When the equality of forces is established, we find that—

$$KV + KK = KM,$$

whereby we are enabled to measure:—

(7) $\quad M \propto V + K.$

By similar reasoning, and by using the possible currents in various combinations, we are enabled to measure no less than nine additional algebraic functions, which are:—

(8) $\quad M \propto V + X$ (9) $\quad M \propto V + XY$

(10) $\quad M \propto VW + K$

(11) $\quad M \propto VW + XY$

(12) $\quad M \propto \dfrac{V + K}{Z}$

(13) $\quad M \propto \dfrac{V + X}{Z}$

(14) $\quad M \propto \dfrac{V + XY}{Z}$

(15) $\quad M \propto \dfrac{VW + K}{Z}$

(16) $\quad M \propto \dfrac{VW + XY}{Z}$

As a practical illustration, it is pointed out that output or input of a 3-phase electrical system may be measured by an instrument arranged to read Formula (11), since the total power of such a system is equal to the sum of (a) the product of current and voltage in one phase, and (b) the product of current and voltage in another phase. Furthermore, Formula (16) may similarly serve to cause the properly constructed instrument to read the ratio between such output or input and a fifth variable factor. For example, a 3-phase turbo-generator may have such an instrument associated therewith to read power output per steam input. These examples are of course merely illustrative of the large variety of practical uses to which the instrument may be put.

In Figures 5-9, we have combined the features of Figure 3, so far as series connection of certain coils is concerned, with the features of Figure 4, so far as plurality of inductance coil pairs is concerned. The notations on Figures 5-9 are believed to be clearly understandable in the light of the foregoing descriptions of Figures 2-4, and no detailed description will here be given, it being believed sufficient to point out the following algebraic functions which the several instruments may be made to record or register.

From Figure 5 we obtain:—

(17) $\quad M \propto \sqrt{V + K}$

(18) $\quad M \propto \sqrt{V + X}$

(19) $\quad M \propto \sqrt{V + XY}$

(20) $\quad M \propto \sqrt{VW + K}$

(21) $\quad M \propto \sqrt{VW + XY}$

Figure 6:
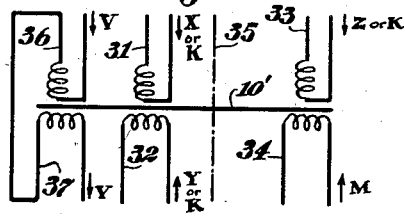

In Figure 6:—

(22) $\quad M \propto V^2 + K$

(23) $\quad M \propto V^2 + X$

(24) $\quad M \propto V^2 + XY$

(25) $\quad M \propto \dfrac{V^2 + K}{Z}$

(26) $$M \propto \frac{V^2+X}{Z}$$

(27) $$M \propto \frac{V^2+XY}{Z}$$

Figure 7:
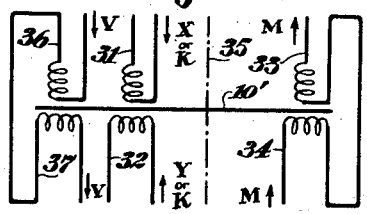

In Figure 7:—

(28) $$M \propto \sqrt{V^2+K}$$

(29) $$M \propto \sqrt{V^2+X}$$

(30) $$M \propto \sqrt{V^2+XY}$$

Figure 8:
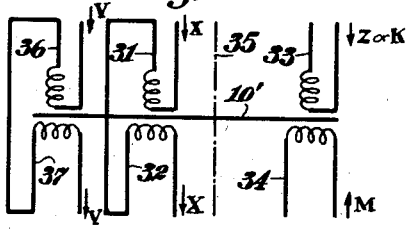

In Figure 8:—

(31) $$M \propto V^2+X^2$$

(32) $$M \propto \frac{V^2+X^2}{Z}$$

Figure 9:
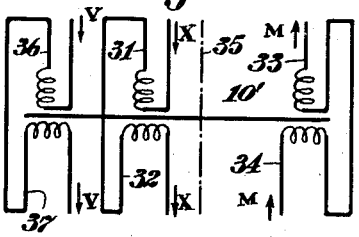

In Figure 9:—

(33) $$M \propto \sqrt{V^2+X^2}$$

Figure 10:
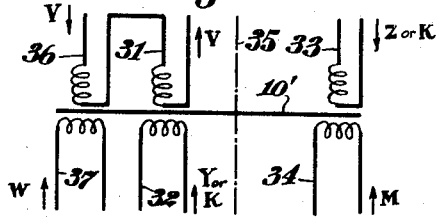

In Figure 10, we have shown a possible modification of the structure of Figure 4 by connecting in series two coils of different inductance coil pairs, viz., coils 36 and 31. This modification enables us to measure four additional algebraic functions. Thus, through coil 34 we pass measuring current M, and through coil 33 we may pass either of currents Z or K. Through coil 37 we pass variable current W, through coil 32 we may pass either the variable current Y or the constant current K, and through coils 36 and 31 we pass current V. With constant currents K flowing in coils 32 and 33, the following equality is established:—

$$VW+VK=KM,$$

whereby—

(34) $$M \propto V(W+K).$$

In a similar manner, we obtain the possibility of measuring:—

(35) $$M \propto V(W+Y)$$

(36) $$M \propto \frac{V}{Z}(W+K)$$

(37) $$M \propto \frac{V}{Z}(W+Y).$$

Figure 11:
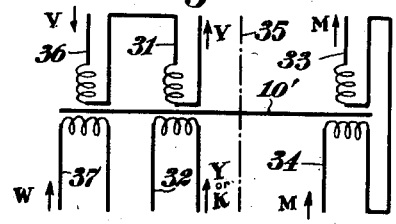

By modifying Figure 10 as shown in Figure 11, so that coils 33 and 34 are in series, and by passing the measurable current M through the series-connected coils 33—34, as illustrated, we are enabled to measure:—

(38) $$M \propto \sqrt{V(W+K)}$$

(39) $$M \propto \sqrt{V(W+Y)}.$$

And if, in the instrument of Figure 11, the measurable current M is caused to pass through the series-connected coils 31—36, and the current V is caused to pass through the series-connected coils 33—34, then the instrument would be enabled to measure either of the following relationships:—

(40) $$M \propto \frac{V^2}{W+K}$$

(41) $$M \propto \frac{V^2}{W+Y}.$$

In Figure 12, we show the original coils 31 and 32 on the left side of the equality line 35, the same as in Figure 2. On the opposite side we show the original coils 33 and 34, and, in addition, a second pair of coils 38 and 39. Coils 34 and 39 are connected in series. Current M is passed through coils 34 and 39. Through coil 33 we pass either of currents Z or K, and through coil 38 we pass current U. Through coil 31 we pass current X, and through coil 32 we pass either of currents Y or K.

The establishment of equality of torques leads to the equation (where K is passed through coils 32 and 33):—

$$XK = MK + MU,$$

whereby we are enabled to measure:—

(42) $$M \propto \frac{X}{U+K}.$$

Similarly, we may obtain a measurement of:—

(43) $$M \propto \frac{XY}{U+K}$$

(44) $$M \propto \frac{X}{U+Z}$$

(45) $$M \propto \frac{XY}{U+Z}.$$

In Figure 13 we have modified Figure 12 by using, alongside of the coils 31 and 32, the additional pair of coils 36 and 37, as in Figure 4. We obtain in this instance ten additional possible algebraic functions which will not be set forth here and which are the same as Formulæ (7) to (11) inclusive respectively divided by either $U+K$ or $U+Z$.

In a similar manner, we may modify Figure 13 to connect the coils 36 and 37 in series, as in Figure 6; to connect coils 36, 37 and 31, 32 in series, as in Figure 8; and to connect coils 36 and 31 in series, as in Figure 10. The formulæ will vary accordingly, and may involve as many as five variables.

In general, it will be understood that the possible variations are extremely great, particularly where more than three pairs are used, as in Figure 13, and we do not mean to limit ourselves to any specific number of pairs nor any specific hook-up of certain coils, except in so far as the proper operation of an instrument of this character may be involved.

As an illustration of the tremendous possibilities of our device, we have shown in Figure 14 a hook-up such as that shown in Figure 4, wherein we have provided three pairs of inductance coils 40, 41; 42, 43; and 44, 45. By passing a constant current or currents K through coils 40, 42, and 44, and by passing through coils 41 and 43 the measuring currents $M_1$ and $M_2$ obtained respectively from any two of the primary instruments hereinbefore described, we are enabled to record or register, (by means of the measuring current M passed through coil 45), nothing less than the sum of the two functions to which the currents $M_1$ and $M_2$ are proportional. And this remarkable result is achieved regardless of the complexity of either or both of the two functions whose sum is measured.

Figure 14 is of course a mere example, and serves figuratively only as a window through which a vast vista of innumerable and almost unbelievable possibilities presents itself. For, obviously, any of the devices illustratively exemplified in Figures 2–13 may be employed as a sort of secondary instrument in which one, two, or more variable currents—themselves proportional to complex algebraic functions—may be employed for the purpose of attaining an "instrument reading" of veritable "functions of functions." No attempt will here be made to elaborate upon these possibilities nor to list even a few of the complex algebraic functions capable of measurement; the important and extremely varied potentialities of our instrument being sufficiently clear to those skilled in the art from the examples and descriptions already given.

Furthermore, it must be mentioned that in all the formulæ, wherein we have used a plus sign, this should in truth be a "plus-or-minus" sign. For example, if in Figure 4 the current in either of the coils 36—37 were reversed (by reversing the terminal connections), or if the current in either of the coils 31—32 were reversed in similar manner, then a minus sign would have appeared in each of the formulæ derived from this figure. The essential feature of proper operation lies in the fact that a plurality of inductance coil pairs are so arranged that certain of them (one or more) exert a torque in one direction while the remainder (one or more) of them exert a counter-torque.

It will also be obvious that our invention is not limited to any specific practical applications, the uses herein described being merely illustrative to explain the general nature of our device and its manifold possibilities. Nor need the profusion of mathematical and algebraic material in the specification lead to the erroneous belief that our invention is something other than a practical device. It is extremely practical, and the specific construction of one embodiment is illustrated in Figure 1. As hereinbefore mentioned, the diagrams set forth in Figures 2–14 are each representative of a complete electric measuring instrument of the present character provided with certain coils connected in certain ways.

Several interesting features of our invention may be noted at this point. A possible application, not hereinbefore illustratively specified, resides in dispensing with the necessity for providing a calibrated scale on an instrument which is "crowded" at one or the other end. For example, in a flow meter, the difference in level of mercury is proportional to the square of the velocity. A uniform resistance immersed in the mercury would therefore change as the square of the velocity, and the current would therefore vary in the same way. If we were to employ a device with the circuit and hook-up which gives us the reading:—

$$M \propto \sqrt{X} \quad \text{(Formula 5)},$$

we shall have compensated for this effect and provided a measuring or indicating current which does not require a crowded scale at low velocities.

Furthermore, the angular position of the shaft or movable spindle does not affect the accuracy of the readings, as it is the same for all pairs of coils.

Also, the ammeter recording the measuring current M may, if desired, be placed at any distance from the coil through which the current M flows, and no compensation need be taken into account for the resistance of long leads to the ammeter. This advantageous result is achieved because the value of current M must of necessity be such as to effect a balance, and the instrument will therefore automatically compensate for the resistance of the leads.

In general, the possible variations in detail and rearrangement of coils and the like is so great that such details are intended herein and in the appended claims to be merely illustrative of the general nature of our invention; and it is not intended that they be interpreted in a limiting sense, except so far as the prior art, of which we are not now cognizant, may necessitate a different interpretation.

Having thus described our invention and illustrated its use, what we claim as new and desire to secure by Letters Patent is—

1. An electric measuring instrument comprising a movable member; two pairs of coactably arranged inductance coils, each pair having one coil fixed and the other mounted on said member; the coils of one of said pairs being connected in series; means for passing an electric current through one of said coils and for passing other currents through certain of the remaining coils so that counter-forces will be exerted upon said member; and means for varying said first-mentioned electric current to equalize said forces; whereby said current will always be proportional to a predetermined algebraic function of said other currents when said equality is established.

2. An electric measuring instrument comprising a movable member; two pairs of coactably arranged inductance coils, each pair having one coil fixed and the other mounted on said member; the coils of one of said pairs being connected in series; means for passing an electric current through said series-connected coils and for passing other currents through the remaining coils so that counter-forces will be exerted upon said member; and means for varying said first-mentioned electric current to equalize said forces; whereby said current will always be proportional to the square-root of the product of said other currents when said equality is established.

3. An electric measuring instrument comprising a movable member; two pairs of coactably arranged inductance coils, each pair having one coil fixed and the other mounted on said member; the coils of one of said pairs being connected in series; means for passing an electric current through one of the independent coils and for passing other currents through the remaining coils so that counter-forces will be exerted upon said member; and means for varying said first-mentioned electric current to equalize said forces; whereby said current will always be proportional to a predetermined algebraic function of said other currents when said equality is established.

4. An electric measuring instrument comprising a movable member; a plurality of pairs of coactably arranged inductance coils, each pair having one coil fixed and the other mounted on said member; the coils of at least one of said pairs being connected in series; means for passing an electric current through one of said coils and for passing other currents through certain of the remaining coils so that counter-forces will be exerted upon said member; and means for varying said first-mentioned electric current to equalize said forces; whereby said current will always be proportional to a predetermined algebraic function of said other currents when said equality is established.

5. An electric measuring instrument comprising a movable member; a plurality of pairs of coactably arranged inductance coils, each pair having one coil fixed and the other mounted on said member; the coils of at least one of said pairs being connected in series; means for passing an electric current through one pair of said series-connected coils and for passing other currents through the remaining coils so that counter-forces will be exerted upon said member; and means for varying said first-mentioned electric current to equalize said forces; whereby said current will always be proportional to a predetermined algebraic function of said other currents when said equality is established.

6. An electric measuring instrument comprising a movable member; a plurality of at least three pairs of coactably arranged inductance coils, each pair having one coil fixed and the other mounted on said member; the coils of each of at least two of said pairs being connected in series; means for passing an electric current through one of said coils and for passing other currents through certain of the remaining coils so that counter-forces will be exerted upon said member; and means for varying said first-mentioned electric current to equalize said forces; whereby said current will always be proportional to a predetermined algebraic function of said other currents when said equality is established.

7. An electric measuring instrument comprising a movable member; a plurality of at least three pairs of coactably arranged inductance coils, each pair having one coil fixed and the other mounted on said member; the coils of each of at least two of said pairs being connected in series; means for passing an electric current through one pair of said series-connected coils and for passing other currents through the remaining coils so that counter-forces will be exerted upon said member; and means for varying said first-mentioned electric current to equalize said forces; whereby said current will always be proportioned to a predetermined algebraic function of said other currents when said equality is established.

8. An electric measuring instrument comprising a movable member; at least three pairs of coactably arranged inductance coils, each pair having one coil fixed and the other mounted on said member; means for passing an electric current through one of said coils and for passing other currents through the remaining coils so that counter-forces will be exerted upon said member; and means for varying said first-mentioned electric current to equalize said forces; whereby said current will always be proportional to a predetermined algebraic function of said other currents when said equality is established.

9. An electric measuring instrument comprising a movable member; at least three pairs of coactably arranged inductance coils, each pair having one coil fixed and the other mounted on said member; certain coils of different pairs being connected in series; means for passing an electric current through one of said coils and for passing other currents through the remaining coils so that counter-forces will be exerted upon said member; and means for varying said first-mentioned electric current to equalize said forces; whereby said current will always be proportional to a predetermined algebraic function of said other currents when said equality is established.

10. An electric measuring instrument comprising a movable member; at least three pairs of coactably arranged inductance coils, each pair having one coil fixed and the other mounted on said member; certain coils of different pairs being connected in series and the two coils of still another pair being also connected in series; means for passing an electric current through one of said coils and for passing other currents through certain of the remaining coils so that counter-forces will be exerted upon said member; and means for varying said first-mentioned electric current to equalize said forces; whereby said current will always be proportional to a predetermined algebraic function of said other currents when said equality is established.

11. An electric measuring instrument comprising a movable member; two pairs of coactably arranged inductance coils, each pair having one coil fixed and the other mounted on said member; means for passing an electric current through one of said coils and for passing other currents through the remaining coils so that counter-forces will be exerted upon said member; means for varying said first-mentioned electric current to equalize said forces; whereby said current will always be proportional to a predetermined algebraic function of said other currents when said equality is established and means for measuring said current.

In witness whereof we have signed and sealed this specification this 15th day of November, 1929.

SIDNEY HAUSMAN.
WALTER VEIT.